United States Patent [19]

Donnelly et al.

[11] 4,234,280
[45] Nov. 18, 1980

[54] PALLETIZER

[75] Inventors: Bernard P. Donnelly; Roland W. Van Slooten, both of Holland, Mich.

[73] Assignee: The Lithibar Company, Holland, Mich.

[21] Appl. No.: 913,565

[22] Filed: Jun. 8, 1978

[51] Int. Cl.³ .............................................. B65G 57/30
[52] U.S. Cl. ....................................... 414/35; 414/46; 414/96
[58] Field of Search ............. 214/6 BA, 6 P; 271/212; 414/35, 36, 92, 95, 96

[56] References Cited

U.S. PATENT DOCUMENTS

| | | | |
|---|---|---|---|
| 2,550,587 | 4/1951 | Neja | 214/6 BA |
| 2,933,207 | 4/1960 | Edmonds et al. | 214/6 BA X |
| 3,038,615 | 6/1962 | Roth et al. | 214/6 BA X |
| 3,057,486 | 10/1962 | Moulthrop | 214/6 BA |
| 3,618,791 | 11/1971 | Potter et al. | 214/6 BA |
| 3,727,370 | 4/1973 | Lassig | 214/6 BA X |
| 3,765,145 | 10/1973 | Davis | 214/6 BA X |
| 3,904,045 | 9/1975 | Thibault | 214/6 BA |

Primary Examiner—L. J. Paperner
Attorney, Agent, or Firm—Price, Heneveld, Huizenga & Cooper

[57] ABSTRACT

An apparatus is disclosed for palletizing or cubing layers of articles such as cartons. The apparatus includes a first subassembly for preparing a layer of articles and introducing the layer into a palletizer subassembly. The palletizer includes a fixed frame supporting a plurality of spaced, generally parallel rollers. A carriage support frame is carried by the fixed frame for vertical movement relative thereto. A pair of carriages are slidably supported by the support frame for movement towards and away from the rollers along the axis of rotation of the rollers. Each carriage includes a plurality of horizontally positioned, spaced tines or fingers which extend between the spaced rollers when the carriages are moved towards the rollers. Clamps supported on the carriage support frame engage a raised layer of articles as well as the successive layer positioned underneath the raised layer upon which the raised articles are placed in order to properly position the articles relative to each other.

18 Claims, 13 Drawing Figures

PALLETIZER

BACKGROUND OF THE INVENTION

The present invention relates to stacking apparatus and more particularly to apparatus for stacking layers or tiers of articles by introducing each successive layer from the bottom of the tiered layers.

In the transport or storage of generally rectangular articles such as cartons, paper bales and the like, it is highly desirable to stack the articles in successive or tiered layers. The tiered articles are easily handled on a pallet by conventional forklift trucks. Various types of apparatus have been proposed for palletizing or cubing such articles for transport and/or storage. The presently available apparatus employs one of several different approaches or methods to palletize. Some of these apparatus successively lower a support member and introduce successive layers on top of the stacked tiers. An example of an apparatus operating in accordance with this method may be found in U.S. Pat. No. 3,986,621, entitled FLAP SENSOR AND HOIST POSITION CONTROL FOR PALLETIZER and issued in the name of Robert E. Bowser on Oct. 19, 1976. The apparatus disclosed in this patent includes a hoist supporting a pallet. The hoist is lowered in incremental stages as each successive layer of articles is stacked thereon at approximately the same horizontal level.

Another method employed by presently available stacking apparatus involves raising each successive layer of articles and placing the layer on top of the previously stacked layers of articles. A still further method involves stacking by introducing successive layers from the bottom of the previously stacked layers of articles. The first layer of articles is raised vertically, a successive layer of articles is introduced underneath the raised layer and the raised layer is lowered onto the successive layer. This cycle is repeated until the desired number of tiers or layers of articles is obtained. An example of this type of apparatus may be found in U.S. Pat. No. 3,904,045 entitled MACHINE FOR LOADING PACKAGES ON A PALLET and issued in the name of Thibault on Sept. 9, 1975. The apparatus disclosed in this patent includes a pair of successively and sequentially operated fork members one on each side of a roller conveyor. The fork members are operated independently for successively lifting the layers of packages so as to permit another layer of packages to be introduced underneath those supported by the forks.

This later method of stacking may also be employed to stack individual cartons. For example, as shown in U.S. Pat. No. 3,866,763 entitled AUTOMATIC CASE STACKER and issued in the name of Alduk on Feb. 18, 1975, individual cartons are raised by a powered ram. The carton is then clamped in the raised position. The ram is lowered and a successive carton is introduced underneath the raised carton. The raised carton is then unclamped and it is lowered onto the successively introduced carton.

SUMMARY OF THE INVENTION

A need exists for a palletizer or cuber which is capable of high speed operation, yet maintains proper orientation of each successively stacked layer of articles with respect to the previously stacked layers, which has a relatively high load handling capability, is efficient in operation and is also relatively easy to manufacture. Essentially, the palletizer in accordance with the present invention includes a layer receiving area defined by a plurality of transversely arranged and spaced members. A carriage is positioned for transverse movement relative to the spaced members and includes a plurality of spaced tines or fingers positionable between the spaced members. Provision is made for reciprocating the carriage from a first position away from the spaced members to a second position with the tines between the spaced members. Provision is made for lifting the carriage and hence, a layer of articles vertically, introducing a successive layer of articles underneath the raised layer, withdrawing the fingers to the first position and permitting the raised layer to be deposited upon the successively introduced layer. Clamp means supported by the lift means are provided for clamping the opposed lateral sides of the raised layer of articles and the opposed lateral sides of the successive layer of articles in order to properly position and arrange the stacked articles relative to each other.

In narrower aspects of the invention, provision is made for moving articles onto a layer preparation surface, moving the prepared layer to the layer receiving area and ejecting the stacked articles from the palletizer.

DETAILED DESCRIPTION OF THE PREFERRED EMBODIMENT

Figure 1:
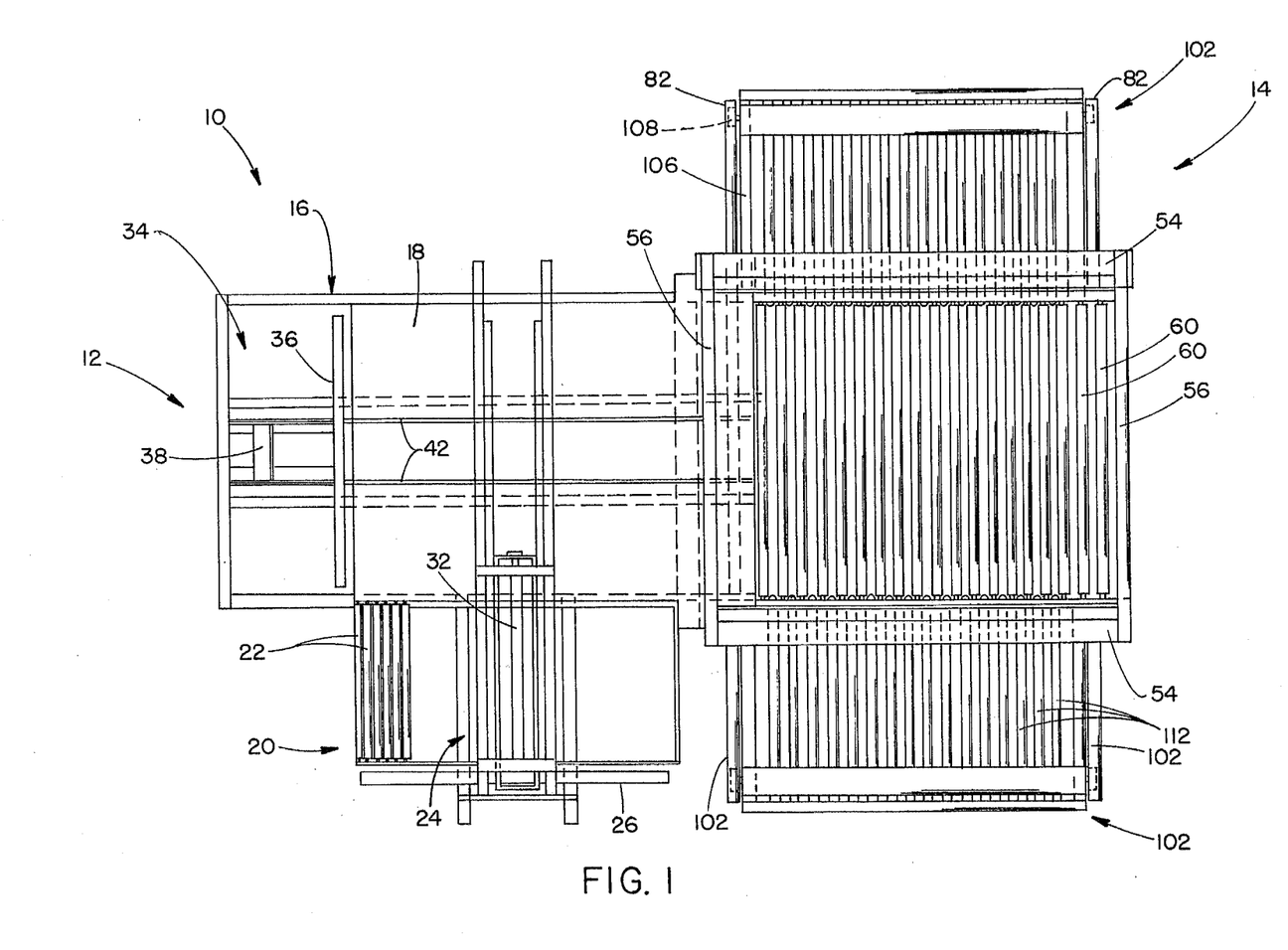
FIG. 1 is a top, plan view of the palletizing apparatus in accordance with the present invention.
Figure 2:
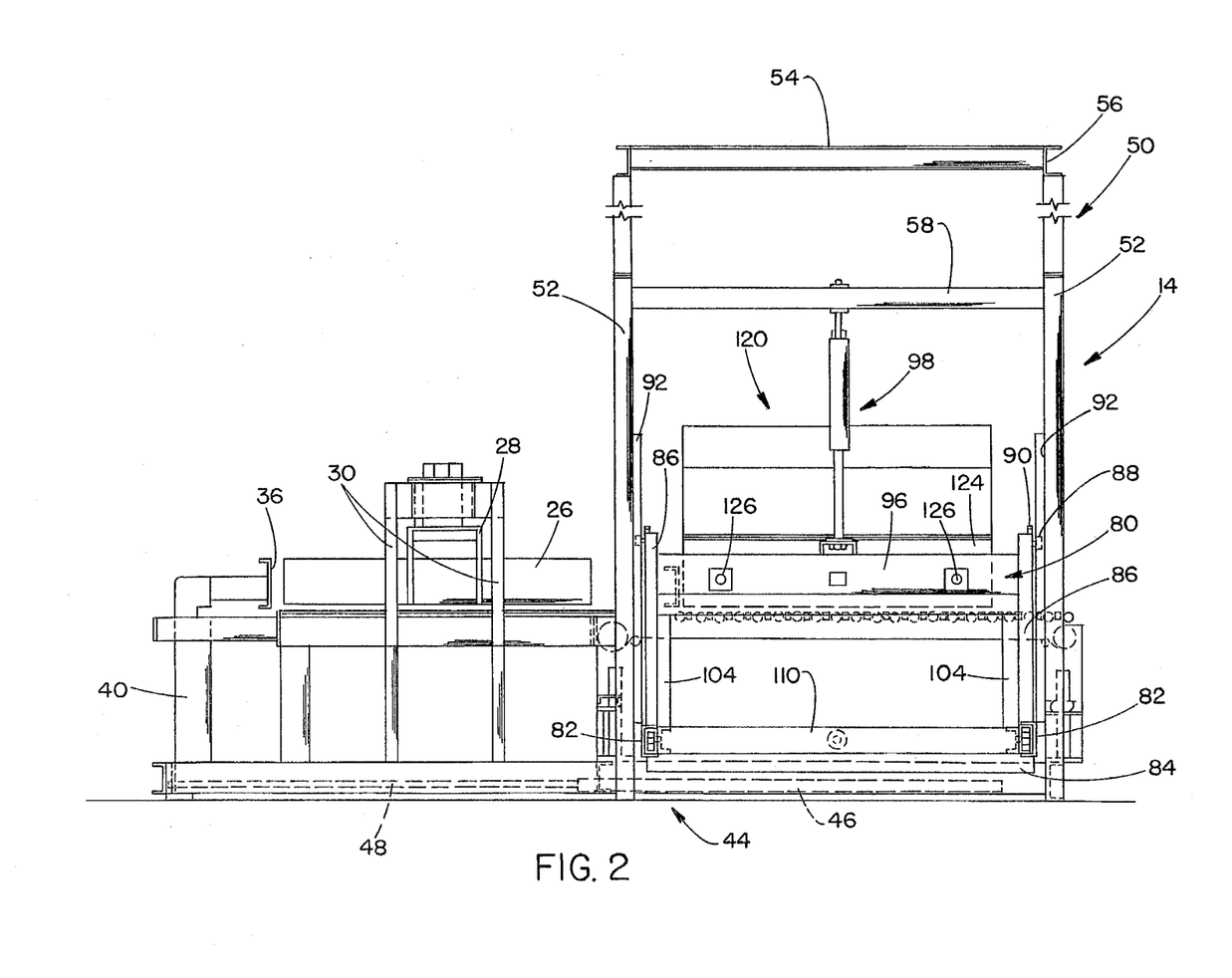
FIG. 2 is a side, elevational view of the palletizing apparatus.
Figure 3:
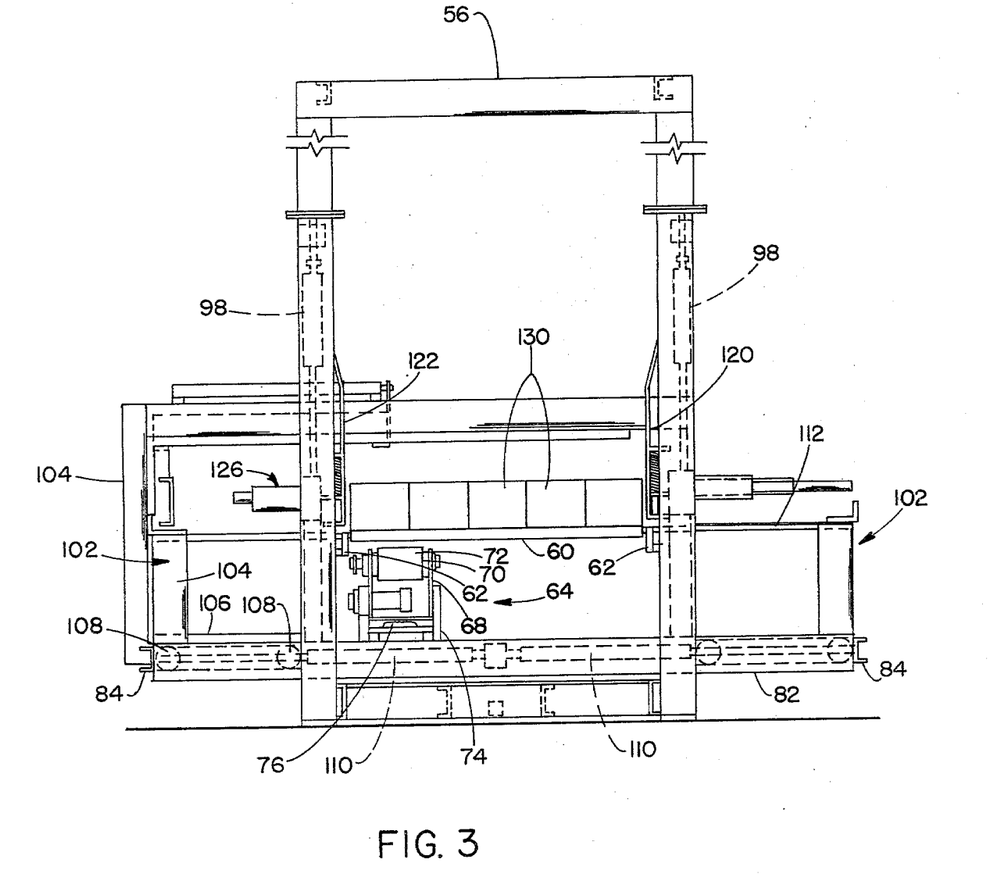
FIG. 3 is an end elevation of the palletizing apparatus.
Figure 4:
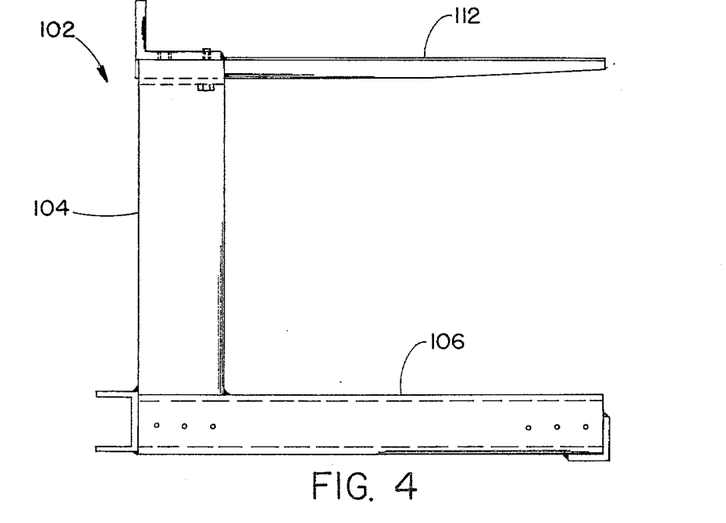
FIG. 4 is a side elevation of the carriage employed in the palletizer.

The preferred embodiment of the unique palletizer or cuber in accordance with the present invention is illustrated in FIGS. 1, 2 and 3 and generally designated 10. The apparatus 10 includes a layer preparation subassembly generally designated 12 and a palletizing subassembly generally designated 14. The subassembly 12 provides an area for preparation of a layer of articles and also introduces the prepared layer into the palletizing subassembly 14.

Subassembly 12 includes a frame 16 supporting a flat plate 18 defining a layer preparation surface. Supported immediately adjacent plate 18 is a package delivery conveyor or side feed device 20. The side feed device includes a plurality of rollers 22, only a number of which are illustrated. A hydraulically actuated side feed pusher 24 is supported above the rollers 22. The side feed pusher 24 includes a plate 26 supported on a frame 28 which in turn is supported on standards 30. Standards 30 ride on tracks 31. An actuator 32 operatively connected to the frame 28 shifts plate 26 towards the article make-up area defined by plate 18.

A second pusher 34 including a pusher plate 36 and a stand or carriage 38 is adapted to load a layer of articles made up on plate 18 into the palletizer subassembly 14. Stand 38 includes uprights or side members 40 and plate 18 is provided with a pair of parallel slots 42 through which the side members 40 pass. The side members 40 are slidably supported within trackways 41 (FIG. 1). A hydraulic actuator 44 including a piston 46 and a rod 48 connected to uprights 40 pushes or shifts the uprights along trackways 41 and hence the pusher plate 36 is moved towards the palletizer subassembly a distance sufficient to deposit a layer of articles therein.

The palletizer subassembly 14 includes a main, fixed frame 50 having vertical uprights 52, upper cross pieces 54 and 56 and intermediate cross pieces 58. The frame 50 supports a plurality of transversely positioned equally spaced, parallel rollers or support members 60. The rollers 60 are rotatably supported by angle members 62 (FIG. 3).

As seen in FIGS. 2 and 3, a stack ejection subassembly 64 selectively powers the roller 60 in order to convey or eject stacked layers of articles out of the palletizer. The ejection 64 includes end support frames 68 which support rollers 70. An endless belt 72 connects the rollers 70. The frame 68 is supported for limited vertical movement within a support frame 74. Pneumatic actuators 76 selectively raise the frame 68 and place the powered belt 72 in driving contact with the undersurface of rollers 60.

Supported on the frame 50 is a carriage support assembly 80. The carriage support assembly 80 includes a pair of opposed, generally parallel channel members 82 defining carriage trackways. The channel members 82 are connected by end cross pieces 84. The carriage subassembly 80 is supported for vertical movement relative to the uprights 52 of frame 50 by vertical standards 86. The vertical standards 86 support glide rollers 88 and 90. Secured to the uprights 52 are vertical guide trackways or tracks 92. The rollers 88 ride within the vertical trackways 92 and the rollers 90 engage the outer surface of the trackways to provide stability when the support frame is raised and lowered. A cross beam 96 connects the uprights 86. A piston/cylinder actuator 98 extends from intermediate cross piece 58 on each side of the frame 50 and is operatively connected to the cross piece 96 of the carriage support frame. As should therefore be apparent, actuation of each piston/cylinder assembly 98 raises and lowers the carriage support frame 80 relative to the rollers 60.

A pair of carriages 102 are slidably mounted on the carriage support frame 80 in opposed, spaced relationship for reciprocation towards and away from each other along the axis of rotation of each roller 60. Each carriage 102 includes an end frame 104 and a base frame or legs 106. Rotatably secured to each of the legs 106 are longitudinally spaced rollers 108. The rollers 108 are disposed within and ride on the trackways defined by channel members 82. A rear cross piece 110 connects the uprights 104 of the carriage. As seen in FIG. 3, a pair of opposed piston/cylinder actuators 110 reciprocate the carriages 102 towards and away from each other. Each of the carriages 102 supports a plurality of spaced, parallel tines or fingers 112. The tines or fingers 112 are spaced so that they may be inserted between rollers 60 when the carriages 102 are reciprocated towards each other. This is clearly shown in FIGS. 1 and 2. The fingers 112 each have a longitudinal dimension approximately one-half the total longitudinal dimension of each roller 60. As a result, when the carriages 102 are shifted inwardly towards each other, the free ends of the fingers 112 will be positioned immediately opposite each other adjacent the longitudinal centerline of the palletizer or the midpoint of each of the rollers.

Figure 6:
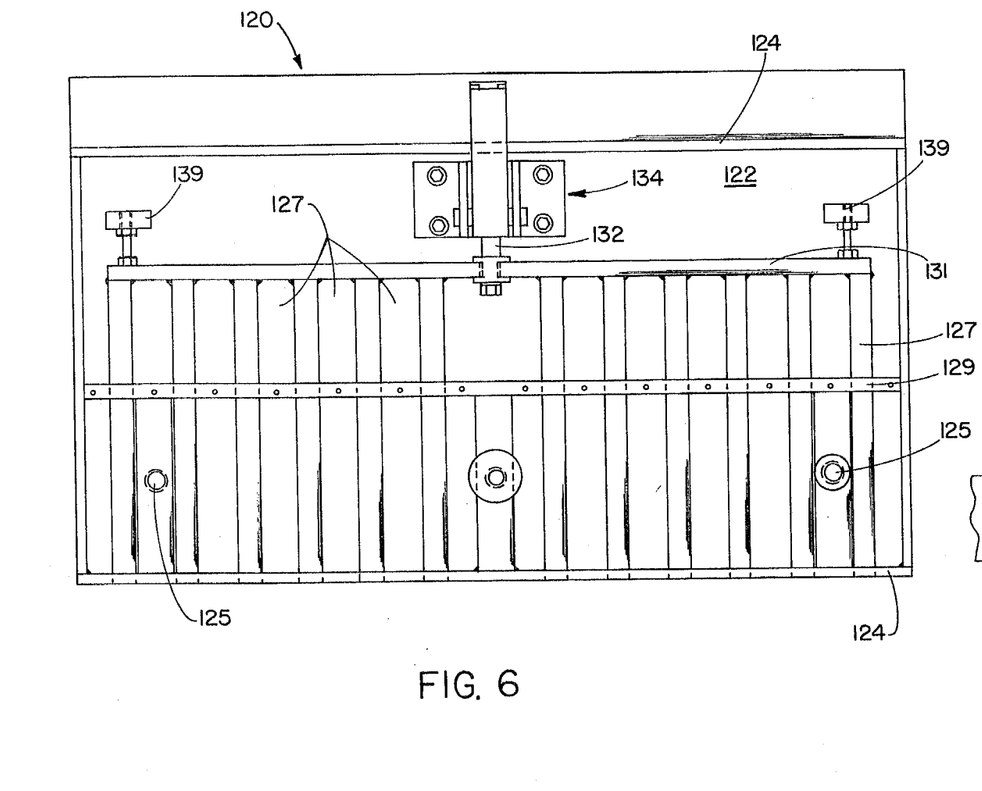
FIG. 6 is a rear, elevational view of the clamp means of FIG. 5.

Supported on the upper cross member 96 in opposed, spaced relationship on the carriage support frame 80 are a pair of clamp means 120. Each clamp means 120 includes a generally vertical plate 122 and rearwardly extending members 124. A pair of piston/cylinder actuators 126 are supported on the cross beam or piece 96. Each actuator 126 includes a rod 128 fixed to the rear face of member 122. The rods 128 support the member 122 in opposed, spaced relationship at apertures 125 (FIG. 6). Extension of the actuators 126 shifts each plate 122 towards the other to clamp, compress and properly position a layer of individual articles 130 (FIG. 3) on the palletizer.

Figure 5:
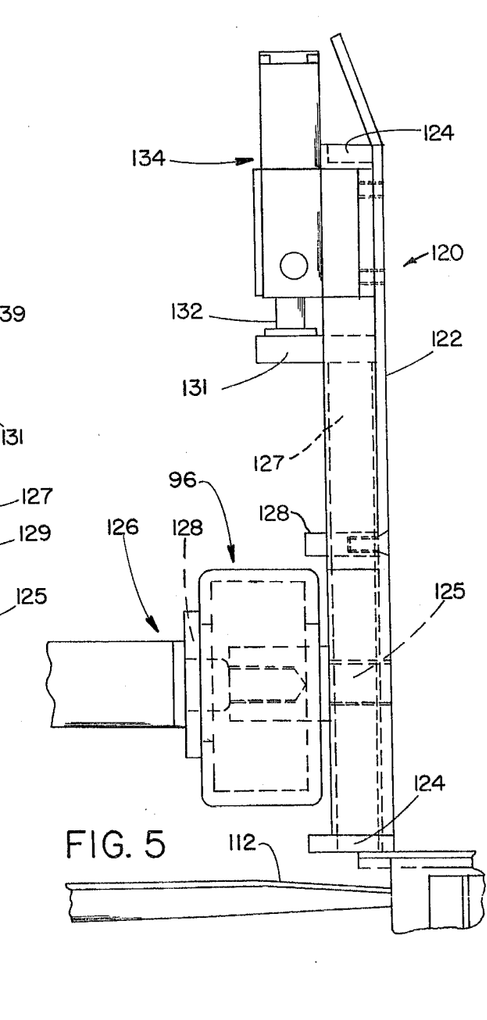
FIG. 5 is a side, elevational view of a portion of the clamp means incorporated in the present invention.

Each of the clamp assemblies 120 also clamp the successive layer of articles positioned on the rollers 60 when the carriage support frame 80 is raised vertically. As best seen in FIGS. 5 and 6, extendible means carried by member 124 and including a plurality of pins 127 engage the successive layer. Each pin 127 is shiftable within a guide 129. The pins 127 are ganged together by a cross piece 131. The cross piece is connected to a rod 132 of a piston cylinder actuator 134. Actuator 134 extends and retracts the pins 127 relative to member 124. Adjustable stops 139 carried by plate 122 limit upward movement of cross piece 130.

OPERATION

In view of the foregoing description, the operation of the palletizer in accordance with the present invention should be readily apparent. The initial layer of articles is prepared on the plate 18 and push bar 36 is actuated to deposit this layer on the rollers 60. Actuators 110 are then retracted to move the carriages 102 towards each other and position the forks 112 between the rollers and immediately underneath the articles 130. Next, the actuators 98 are retracted to raise the layer of articles a distance sufficient to permit the successive layer of articles to be placed on the rollers 60. The successive layer of articles is then prepared on the plate 18 and push bar 36 is actuated to position this layer on the rollers 60. The actuators 98 may then be adjusted to lower the tines or fingers 112 until they almost touch the upper surface defined by the articles 130 of the successive layer. Next, the actuators 126 are extended to clamp and properly position the raised layer of articles. The pins 127 are extended by actuation of piston/cylinder assembly 134 in the embodiment of FIG. 5. The pins therefore engage, compress and properly arrange the layer to be added to the stack. Actuators 110 are retracted and the carriages 102 are moved outwardly relative to each other thereby retracting the tines or fingers 112. The extended pins 127 insure that any "flaps" on the top of the cartons 130 are not pulled out when the tines are retracted since, as seen in FIGS. 3, 5 and 6, pins 127 will be interposed between and extend below the tines. Next, the actuators 126 are retracted thereby unclamping the upper layer of articles and permitting this layer to drop onto the newly added layer. The pins 127 are retracted and the carriage support assembly 80 is lowered to its initial position.

The operating cycle is repeated a sufficient number of times until the desired number of layers of articles is stacked. Once the desired number of layers is obtained, a pallet is positioned under the stack by repeating the operating cycle and the pneumatic actuators 76 of the belt-type roller drive are pressurized, thereby raising the belt 72 into contact with the rollers 60. The stacked layers on the pallet are then ejected from the palletizer 14.

The palletizer, due to the unique clamping assemblies 120, insures a tight pack of the articles during the palletizing operation. The tier added to the stack is properly positioned relative to the previously stacked articles. Also, the clamping assemblies 120 reduce the drag on the tines when the carriages 102 are shifted outwardly away from each other and also hold the upper tiers up when the tines are removed. It is presently preferred that the upper surfaces of the fingers or tines 112 be smoothly polished metal to reduce drag. In the alternative, the upper surfaces could be coated with a suitable plastic material, such as Nylon, to reduce the drag between the tines and the upper surface of the articles 130.

ALTERNATIVE SIDE FEED DEVICE

Figure 7:
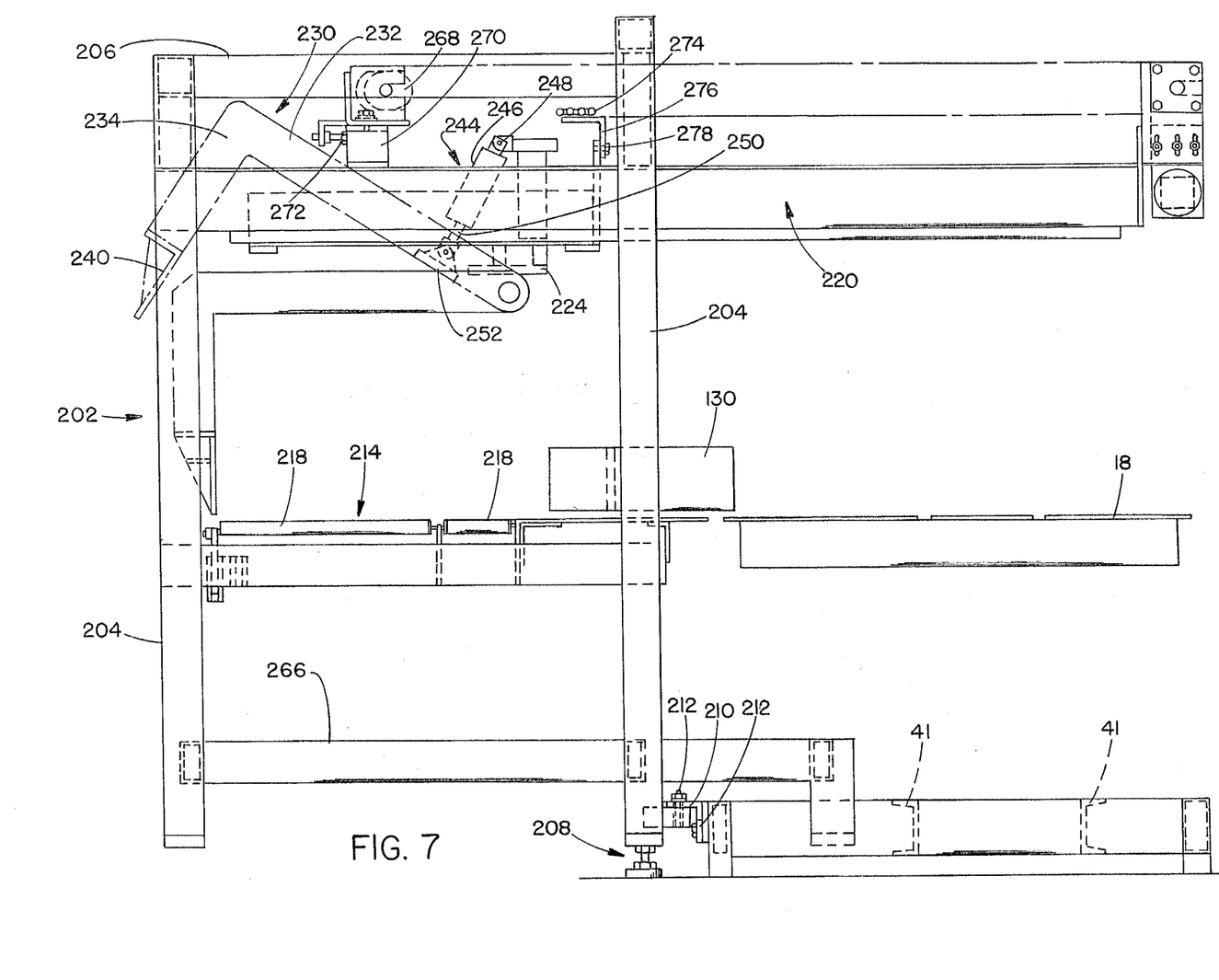
FIG. 7 is a side, elevational view of an alternative side feed means for moving articles onto a layer preparation surface.
Figure 8:
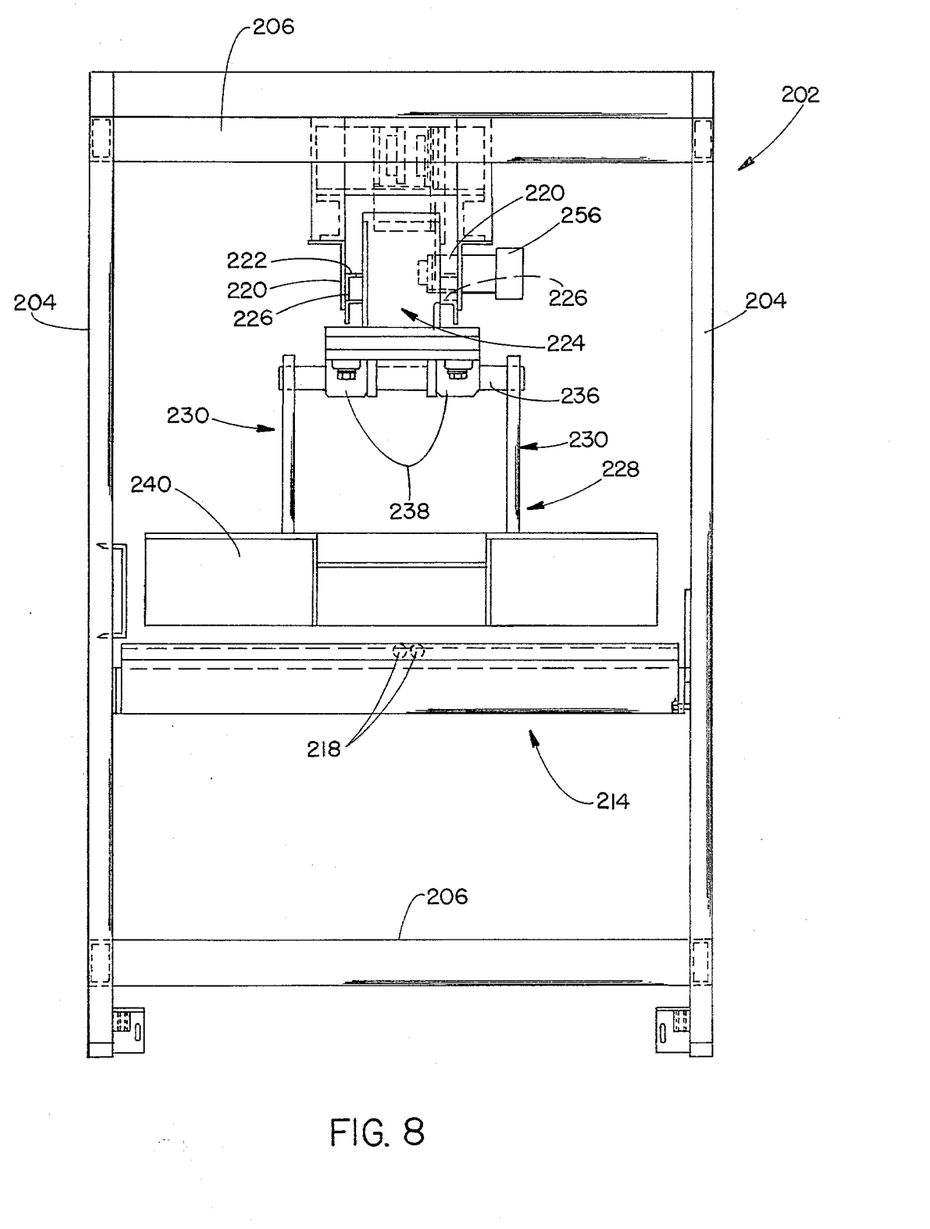
FIG. 8 is an end, elevational view of the side feed means of FIG. 7.
Figures 9, 11, 12:
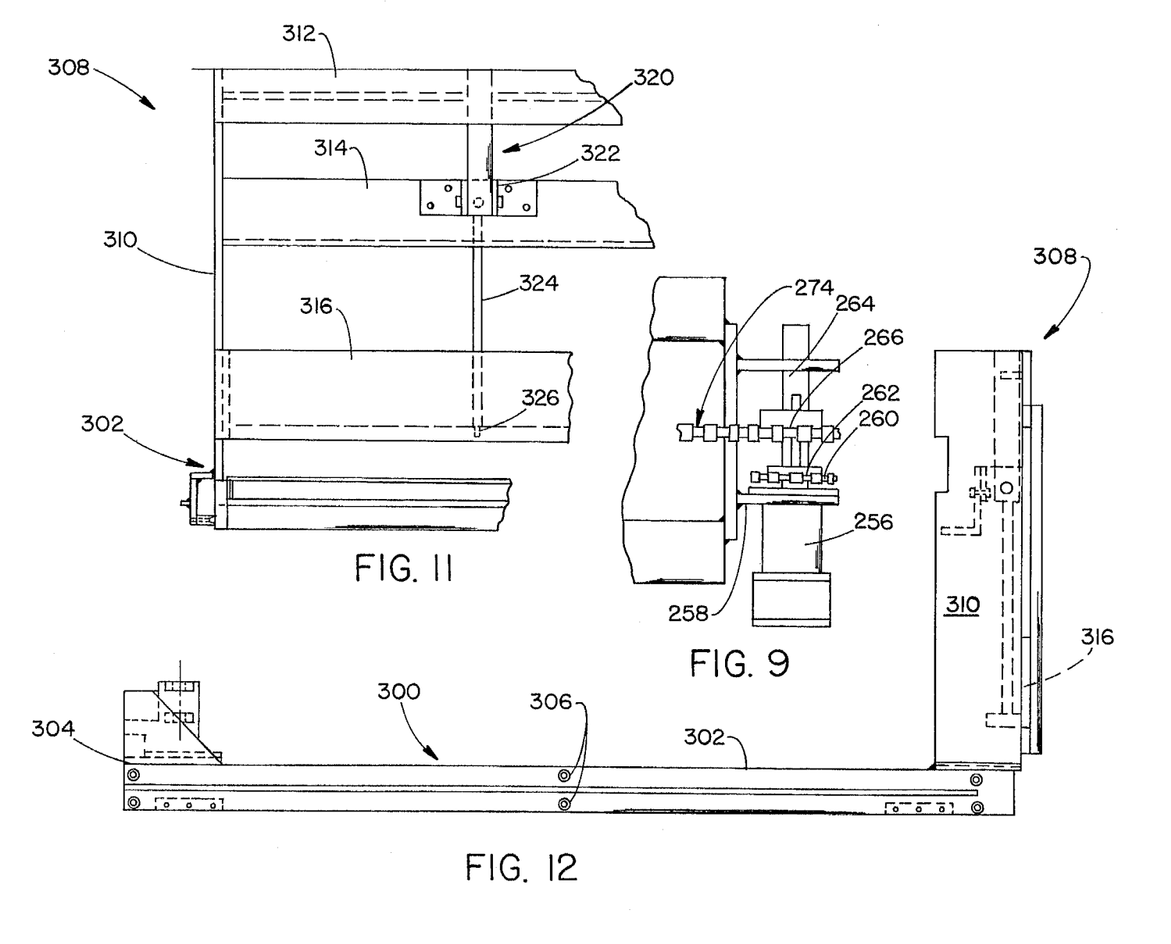
FIG. 9 is a fragmentary, top plan view of a chain drive for the side feed means of FIG. 7.
FIG. 11 is a fragmentary, front elevational view of the ejection means of FIG. 10.
FIG. 12 is a side, elevational view of the ejection means of FIG. 10.

An alternative side feed device for transferring articles onto the layer preparation surface or area defined by the flat plate 18 is illustrated in FIGS. 7, 8 and 9. The side feed device generally designated 20' is adapted for positioning on either side of the support plate 18 and is presently preferred over the side feed device 20 illustrated in FIGS. 1 and 2.

The side feed device 20' includes a support frame 202 having vertical uprights 204 and horizontal supports or standards 206. The frame includes adjustable leveling feet 208, only one of which is shown in FIG. 7. The frame may be affixed to the support structure for the flat plate 18 by suitable mounting brackets 210 and fasteners 212.

The support frame 202 supports a forming table 214. The forming table 214 is positioned generally horizontally and in the same horizontal plane as the flat plate 18 defining the layer preparation surface. In the embodiment illustrated in FIGS. 7 and 8, the forming table 214 includes a plurality of rollers 218, only two of which are schematically illustrated in FIG. 8. The rollers 218 increase the ease of arrangement and placement of articles 130 on the forming table 214.

Supported above the forming table 214 by the frame 202 and extending outwardly therefrom over the plate 18 are trackways 220. Trackways 220 include channel shaped portions 222 which define tracks. A carriage 224 is supported by the tracks 222 for reciprocating movement therealong. The carriage 224 has rollers 226 secured thereto which ride within the tracks 222. Pivotally mounted to the carriage 224 is a claw assembly 228. The claw assembly 228 includes generlly L-shaped side arms 230 having portions 232 and 234. One end of portion 232 is pivotally mounted to the carriage 224 by a cross pin or pivot pin 236. The pivot pin 236 extends between the arms 230 and is pivotally supported by bearing assemblies 238 (FIG. 8). The arm portions 234 carry a pusher plate 240. The pusher plate 240, as seen in FIG. 8, is dimensioned to extend across substantially the entire width of the forming table 214.

As seen in FIG. 7, provision is made for shifting the claw assembly 228 between a first, raised position providing free access to the forming table 214 and a lowered, operating position at which the claw assembly may be used to transfer articles 130 from the forming table to the layer preparation surface on plate 18. The claw assembly 228 is shifted between these positions in the embodiment illustrated by a piston/cylinder subassembly 244 (FIG. 7 only). A cylinder 246 has one end 248 pivotally mounted to the carriage 224. The piston rod 250 is pivotally connected at its free end to a cross piece 252 extending between the side arms 230. Actuation of the piston/cylinder assembly 244 raises and lowers the claw assembly 228.

A side feed carriage drive is supported on the trackways 220 to reciprocate the carriage towards and away from the flat plate 18 along the trackways. As schematically illustrated in FIG. 7 and as shown in FIG. 9, the drive includes a suitable motor 256 mounted by a bracket 258 at the free end of the trackways 220. The motor 256 is operably connected by a roller chain 260 to a sprocket 262 non-rotatably mounted on a stub shaft 264. Non-rotatably secured to the stub shaft 264 is another sprocket 266. Sprockets 262 and 266 serve a gear reduction function. As seen in FIG. 7, another sprocket 268 is supported above trackways 220 by a suitable bracket 270. Sprocket 268 is adjustably positioned by means of a bolt 272.

Extending between sprockets 266 and 268 is a roller chain 274 (FIGS. 7 and 9). Secured to the roller chain 274 at a point on the lower run thereof is a connecting bracket 276. The connecting bracket 276 in turn is connected to the carriage 224 by a suitable fastener 278. Operation of the motor 256 will cause the bracket 276 to traverse the length of the trackways 220 thereby shifting the carriage 224.

In use, the operator will position packages or articles 130 on the forming table 214. When a sufficient number of packages 130 are arranged on the forming table, piston cylinder 244 will be actuated to lower the claw assembly 228. Drive motor 256 will then be actuated shifting the carriage 224 along the trackways 220 and to the right when viewed in FIG. 7. The plate 240 will therefore contact the articles and transfer same from the forming table 214 to the layer preparation area defined by flat plate 18.

ALTERNATIVE STACK EJECTION SUBASSEMBLY

Figure 10:
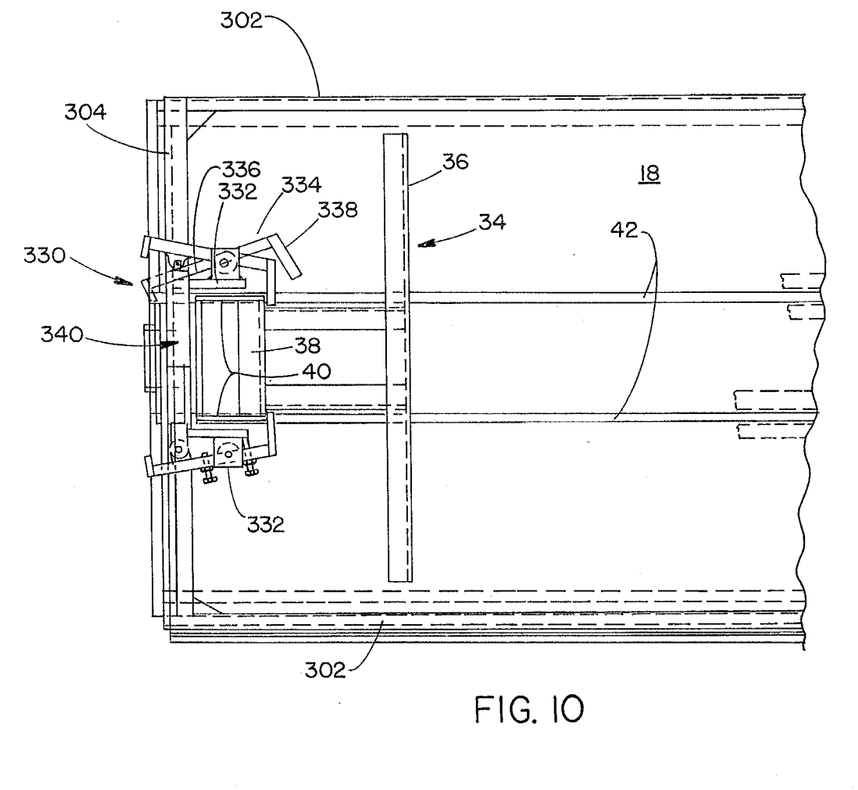
FIG. 10 is a fragmentary, top plan view of an alternative ejection means.
Figure 13:
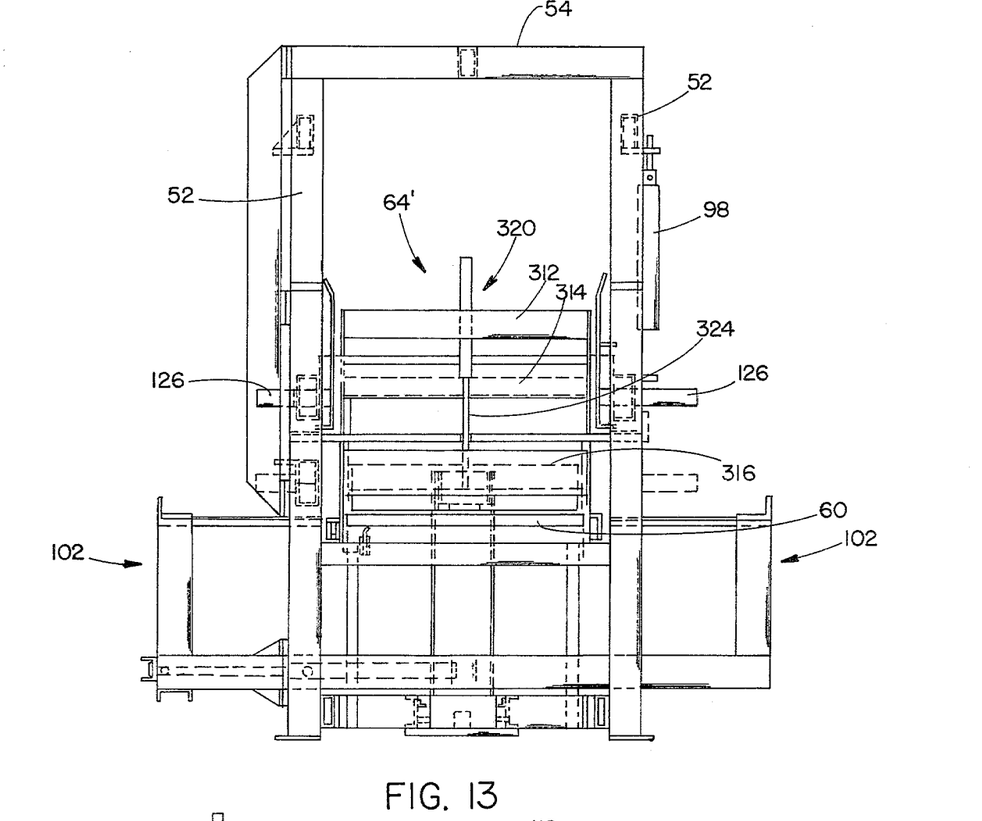
FIG. 13 is an end, elevational view of the palletizing apparatus including the ejection means of FIG. 10.

Another embodiment of the stack ejection subassembly illustrated in FIG. 1 is shown in FIGS. 10-13. The alternative stack ejection subassembly designated 64' is presently preferred to the endless belt 72 and pneumatic actuator 76 which comprise the ejection subassembly 64. The stack ejection subassembly 64', as shown in FIGS. 10, 11 and 12, includes an ejection carriage 300 having side members 302 and an end member 304. The side members 302 carry longitudinally spaced sets of cam rollers 306. The cam rollers 306 are vertically spaced within each set and adapted to support the carriage 300 along the lateral edges of flat plate 18. Positioned at the forward end of the carriage 300 is an open frame member 308. Open frame member 308 includes vertical uprights 310, an upper fixed plate 312 extending between the uprights 310 and an intermediate fixed plate 314 extending between the uprights. Slidably supported between the uprights 310 is a vertically movable ejection pusher plate 316. A piston/cylinder actuator 320 is supported on the frame 308 by a suitable bracket 322. A piston rod 324 of the piston/cylinder assembly 320 is connected at its free end 326 to the vertically movable pusher plate 318. The piston/cylinder assembly 320 shifts the pusher plate 316 from a lowered, eject position, illustrated in FIGS. 11 and 13, to an upper position at which a prepared layer of articles may be pushed through the open frame and loaded into the palletizing subassembly 14 by the pusher 34.

Supported on the end member 304 of the carriage 300 is a latch subassembly 330. The latch subassembly 330 includes suitable mounting brackets 332 extending from the rear member 304 towards the open frame 308. Pivotally supported on each of the brackets 332 is a latch member 334. Each latch member 334 includes a portion 336 and a portion 338. Connected between portions 336 is a hydraulic piston/cylinder subassembly 340. The cylinder subassembly 340 is connected to one of the latch members 334 and the piston rod is connected to the other member 334. Actuation of piston/cylinder assembly 340 therefore shifts portions 338 of each latch member towards the stand or carriage 38 and into engagement therewith or away from the carriage 38 and out of engagement therewith. When in the engaged position shown in FIG. 10, the ejection carriage 300 will be pushed by the carriage or stand 38 towards the palletizing subassembly 14.

During normal operation, the vertically shiftable pusher plate 316 is maintained in the upper non-operative position and the latch members 334 are positioned so as to be out of engagement with the carriage or stand 38. A layer of articles prepared on the plate 18 may then be introduced into the palletizing subassembly 14 by the pusher plate 36. The layer will pass underneath the plate 316 and through the open frame 308.

When a complete stack of articles has been prepared by the palletizer assembly, as previously described, actuator 320 is activated and the plate 316 is lowered to its operating position. Actuator 330 is then activated and the latch members 334 are moved into engagement with the carriage or stand 38. Hydraulic actuator 44 is then activated, shifting the carriage 38 longitudinally along the support plate 18 to thereby shift the carriage 300 towards and into the palletizing subassembly 14. As the plates 312, 314 and 316 sweep across the rollers 60, the palletized layer of articles will be pushed and ejected from the palletizing subassembly.

The present invention may be used to palletize cartons, packaged material or newspaper bales, for example. If employed to palletize baled newspapers, it is presently preferred that a carriage be substituted for the pusher bar 36 to introduce the layers of newspapers onto the roller 60. A carriage may be necessary to prevent tearing or pulling apart of the individual newspapers.

As should be readily apparent to those of ordinary skill in the art, the present invention provides an efficient and high speed apparatus for palletizing a wide variety of generally rectangular or other shaped articles. The present apparatus insures that the stacked layers are properly orientated with respect to each other. The palletizer is extremely efficient in operation and is also relatively inexpensive to manufacture when compared to prior art palletizers due to a reduction in complexity.

In view of the foregoing description, however, various modifications will undoubtedly now become apparent which would not depart from the inventive concepts disclosed herein. For example, loaders other than the push bars 26, 36 could be employed to deposit a previously made-up layer onto the rollers 60. Further, screw type actuators could be employed for the piston/cylinder assemblies illustrated. Therefore, it is expressly intended that the above description should be considered as that of the preferred embodiment. The true spirit and scope of the present invention will be determined by reference to the appended claims.

The embodiments of the invention in which an exclusive property or privilege is claimed are defined as follows:

1. An apparatus for stacking a plurality of layers of articles on top of each other, comprising:
    a fixed frame supporting a plurality of spaced, parallel rollers;
    a carriage support frame supported by said fixed frame for vertical movement relative thereto;
    a pair of opposed carriages slidably supported on said carriage support frame for movement towards and away from each other and from said rollers along the axis of rotation of said rollers, said carriges each supporting a plurality of spaced, parallel tines, said tines lying in the same horizontal plane and extending between said rollers as said carriages move towards said rollers and towards each other;
    clamp means mounted on said carriage support frame for clamping a layer of articles placed on said rollers; and
    means for simultaneously shifting said carriages towards each other and said rollers to position said tines under a layer of articles and for lifting said carriage support frame to bring said tines into engagement with said articles above said rollers to lift said articles vertically and for actuating said clamp means.

2. An apparatus as defined by claim 1 further including means for selectively powering said rollers to remove stacked layers of articles from said apparatus.

3. An apparatus as defined in claim 2 wherein said clamp means comprises:
    a first plate supported on said carriage support frame for vertical movement therewith;
    a second plate supported on said carriage support frame for vertical movement therewith in spaced, parallel relationship with said first plate; and
    means for moving said first and second plates towards each other to clamp a layer of articles therebetween.

4. An apparatus for stacking a plurality of layers of articles on top of each other, comprising:
    a fixed frame supporting a plurality of spaced, parallel rollers;
    a carriage support frame supported by said fixed frame for vertical movement relative thereto;
    a carriage slidably supported on said carriage support frame for movement towards and away from said rollers along the axis of rotation of said rollers, said carriage supporting a plurality of spaced, parallel tines, said tines lying in the same horizontal plane and extending between said rollers as said carriage moves towards said rollers;

clamp means mounted on said carriage support frame for clamping a layer of articles placed on said rollers;

means for shifting said carriage towards said rollers to position said tines under a layer of articles for lifting said carriage support frame to bring said tines into engagement with said articles above said rollers and for actuating said clamp means;

another carriage slidably supported on said carriage support frame in opposed relationship to said a carriage, said another carriage supporting a plurality of spaced, parallel tines, said tines lying in the same horizontal plane and extending between said rollers as said another carriage moves towards said rollers;

means for shifting said another carriage towards said rollers as said means for shifting said carriage shifts said a carriage towards said rollers, and wherein said clamp means comprises:

a first plate supported on said carriage support frame for vertical movement therewith;

a second plate supported on said carriage support frame for vertical movement therewith in spaced, parallel relationship with said first plate; and means for moving said first and second plates towards each other to clamp a layer of articles therebetween, said clamp means further comprising:

extensible means carried by each of said plates for clamping and positioning a successive layer of articles placed on said rollers after said support frame has lifted vertically raising a layer of articles.

5. An apparatus as defined by claim 4 wherein said extensible means comprises:

a plurality of vertically supported, equally spaced pins; and means for shifting said pins below the lower edge of said plate as said support frame is lifted vertically.

6. An apparatus as defined by claim 5 wherein said carriage support frame comprises a pair of opposed, parallel track members, said carriage and said another carriage riding on said track members.

7. An apparatus as defined by claim 6 wherein said fixed frame comprises a pair of opposed, spaced rectangular frames, each including a pair of vertical uprights and an upper cross member and further including guide tracks extending along said vertical uprights, said carriage support frame including glides disposed within said guide tracks.

8. An apparatus as defined by claim 7 wherein said carriages each include:

a pair of spaced, parallel base members; and a pair of longitudinally spaced rollers carried by each of said base members, said rollers riding on a respective one of said support frame track members.

9. An apparatus as defined by claim 8 wherein said clamp means comprises:

a first plate supported on said carriage support frame for vertical movement therewith;

a second plate supported on said carriage support frame for vertical movement therewith in spaced, opposed, parallel relationship with said first plate; and means for moving said first and second plates towards each other to clamp a layer of articles therebetween.

10. An apparatus as defined by claim 9 wherein said clamp means further comprises:

extensible means carried by each of said plates for clamping a layer of articles placed on said rollers after said support frame has lifted vertically raising a layer of articles.

11. An apparatus as defined by claim 9 wherein said extensible means comprises:

a plurality of vertically supported pins; and means for shifting said pins below the lower edge of said plate as said support frame is lifted vertically.

12. An apparatus as defined by claim 11 wherein the upper surfaces of said tines are polished to reduce friction between said tines and a layer of articles supported thereon.

13. An apparatus as defined by claim 12 wherein the upper surfaces of said tines are coated with a friction reducing plastic material.

14. An apparatus for stacking layers of articles by introducing successive layers of articles from the bottom of the stacked layers, said apparatus being of the type including a generally horizontal support at which a layer of articles is made up and an improved stacking apparatus to which the layer of articles is introduced, said improved stacking apparatus comprising:

a layer receiving area defined by a plurality of transversely arranged, spaced members;

a carriage positioned for transverse movement and including a plurality of spaced tines, said tines being positionable between said spaced members;

power means for reciprocating said carriage to move said tines from a first position away from said spaced members to a second position wherein said tines are positioned between said members;

lift means operatively connected to said carriage for lifting said carriage and said tines when said tines are in said second position a distance vertically greater than the height of a single layer of articles so that a successive layer of articles may be introduced onto said layer receiving area under said raised layer supported on said tines; and clamp means supported by said lift means for clamping opposed lateral sides of the raised layer of articles and opposed lateral sides of the successive layer of articles to position the successive layer properly for stacking.

15. An apparatus as defined by claim 14 wherein said clamp means comprises:

a pair of opposed plates; and means for shifting said plates towards each other to thereby clamp a layer of articles supported on said tines.

16. An apparatus as defined by claim 15 wherein said clamp means further comprises:

means supported immediately adjacent each of said plates and extending downwardly when said carriage is lifted vertically for clamping the successive layer of articles introduced onto said layer receiving area under said raised layer.

17. An apparatus as defined by claim 16 wherein said downwardly extending means comprises a plurality of vertically positioned, spaced pins and means for extending said pins downwardly when said carriage is lifted vertically.

18. An apparatus as defined by claim 17 wherein said means for extending said pins comprises:

a gang member extending between each of said pins and ganging said pins together; and power means operatively connected to said gang member for extending said pins downwardly and for retracting said pins.

* * * * *